United States Patent
Newman

(10) Patent No.: US 10,996,352 B2
(45) Date of Patent: May 4, 2021

(54) IMAGING RADIATION DETECTOR ARRAY

(71) Applicant: David Edward Newman, Poway, CA (US)

(72) Inventor: David Edward Newman, Poway, CA (US)

( * ) Notice: Subject to any disclaimer, the term of this patent is extended or adjusted under 35 U.S.C. 154(b) by 371 days.

(21) Appl. No.: 16/396,722

(22) Filed: Apr. 28, 2019

(65) Prior Publication Data

US 2020/0400857 A1     Dec. 24, 2020

Related U.S. Application Data

(60) Provisional application No. 62/739,170, filed on Sep. 29, 2018, provisional application No. 62/785,464, filed on Dec. 27, 2018, provisional application No. 62/839,673, filed on Apr. 27, 2019.

(51) Int. Cl.
    *G01T 3/06* (2006.01)
    *G01T 1/20* (2006.01)

(52) U.S. Cl.
    CPC .................. *G01T 3/06* (2013.01); *G01T 1/20* (2013.01); *G01T 1/2002* (2013.01)

(58) Field of Classification Search
    None
    See application file for complete search history.

(56) References Cited

U.S. PATENT DOCUMENTS

| | | |
|---|---|---|
| 4,037,105 A | 7/1977 | Laurer |
| 4,262,202 A | 4/1981 | Cusano |
| 5,880,469 A | 3/1999 | Miller |
| 6,392,236 B1 | 5/2002 | Maekawa |
| 6,566,657 B2 | 5/2003 | Odom |
| 7,638,776 B2 | 12/2009 | Vydrin |
| 7,745,800 B1 | 6/2010 | McGinnis |
| 8,030,617 B2 | 10/2011 | Enghardt |
| 8,121,248 B2 * | 2/2012 | Ikhlef ............... A61B 6/032 378/19 |
| 8,143,586 B2 | 3/2012 | Inbar |
| 9,733,367 B1 | 8/2017 | Derzon |
| 9,958,561 B2 | 5/2018 | Bellinger |
| 2003/0226971 A1 | 12/2003 | Chandross |
| 2008/0191140 A1 | 8/2008 | McDevitt |
| 2009/0166549 A1 | 7/2009 | Czirr |
| 2010/0090097 A1 | 4/2010 | Koltick |
| 2010/0090115 A1 | 4/2010 | Lerch |
| 2010/0258734 A1 | 10/2010 | McCormick |
| 2011/0101230 A1 | 5/2011 | Inbar |
| 2015/0301203 A1 | 10/2015 | Lennert |
| 2018/0136344 A1 | 5/2018 | Nelson |

\* cited by examiner

*Primary Examiner* — Edwin C Gunberg

(57) ABSTRACT

An imaging radiation detection system, useful in detecting and localizing radioactive materials, may include a large number of particle detectors stacked in a two-dimensional array. The array may include protruding detectors interleaved with recessed detectors, in which each detector is oriented in a different direction. The array may have a checkerboard-type arrangement of protruding and recessed detectors. Detection data from the recessed detectors may include a radiographic image indicating the distribution of radioactive sources in view. Embodiments with high detection efficiency and large field of view can rapidly detect and localize even well-shielded threat sources at substantial distances.

20 Claims, 10 Drawing Sheets

1201  1202

1301  1302

1408
1401
1402

1501
1502

IMAGING RADIATION DETECTOR ARRAY

CROSS REFERENCE TO RELATED APPLICATIONS

This application claims the benefit of U.S. Provisional Patent Application No. 62/726,295 filed on Sep. 2, 2018, and U.S. Provisional Patent Application No. 62/787,694 filed on Jan. 2, 2019, and U.S. Provisional Patent Application No. 62/839,673 filed on Apr. 27, 2019, the entire disclosures of which are incorporated by reference as part of the specification of this application.

FIELD OF THE INVENTION

The present invention relates generally to detecting radiation sources. More particularly, the present invention is directed in one exemplary aspect to a radiation detection system that produces an image of radiation sources.

BACKGROUND

The U.S. Congress has ordered that all cargo entering the country must be inspected for clandestine radiological and nuclear materials. Unfortunately, this is still not feasible. Although threat materials emit radiation (principally gamma rays and/or neutrons), sufficient shielding can greatly reduce the amount of escaping radiation. In addition, natural radiation (cosmic rays and radioactive materials in the environment) further complicate detection. In the short time allocated for an entry scan at a shipping port (typically less than 2 minutes and often less than 1 minute), current detectors cannot detect a well-shielded nuclear weapon.

Advanced detectors with large solid angle acceptance and high detection efficiency are needed. In addition, detectors are needed that can determine the spatial distribution of radiation sources so that they can be distinguished from backgrounds. What is needed is an advanced detector or detector array capable of efficiently detecting even a well-shielded source, separating neutrons and gamma rays of various energies, and determining the spatial distribution of radiation sources present. Preferably the detection and imaging may be completed rapidly and automatically, without using expensive or rare materials, and preferably at low cost.

SUMMARY

A system for detecting and imaging radiation sources, includes a detector array with at least 40 detectors, each detector configured to detect particles from the radiation sources and responsively emit a signal, wherein the at least 40 detectors include protruding detectors interleaved with recessed detectors, each recessed detector being adjacent to a plurality of protruding detectors, and each protruding detector protruding beyond the adjacent recessed detectors by an offset distance that is at least equal to the thickness of the recessed detectors; a camera configured to acquire a photographic image of an inspection region; and non-transient computer-readable media containing instructions for a method that includes preparing a first radiographic image according to detection data of the recessed detectors, preparing a second radiographic image according to detection data of the protruding detectors, acquiring the photographic image of the inspection region, and producing a composite image showing the spatial distribution of the radiation sources in the inspection region by combining the first and second radiographic images with the photographic image.

These and other embodiments are described in further detail with reference to the figures and accompanying detailed description as provided below.

DETAILED DESCRIPTION

Figure 1:
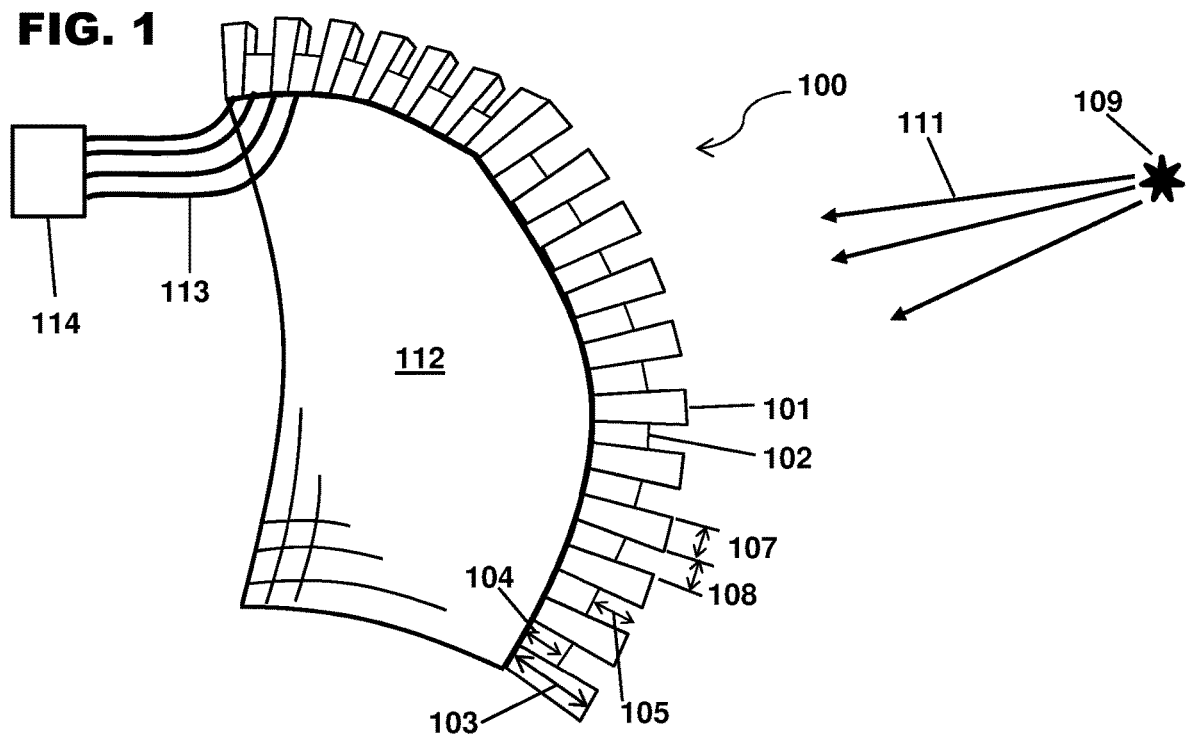
FIG. 1 is a perspective sketch of an exemplary detector array including protruding and recessed detectors, according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein is a system for imaging radiation (the "system"). The system may include an array of detectors (the "detector array") configured to detect gamma rays or neutrons or both (the "particles") from one or more sources of radiation (the "sources") in a spatial or angular region (the "inspection region"), and to responsively transmit signals such as electrical pulses to a processor. The system may further include a camera configured to produce a photographic image of the inspection region, using visible or infrared light (or both) to show items in the inspection region. The processor may be configured to receive the signals from the detectors and produce a radiographic image of the sources, such as a two-dimensional image or rendition showing the distribution of radiation detected from sources in the inspection region. The system may be configured to combine the photographic image and the radiographic image, thereby producing a "composite" image that shows items in the inspection region as well as the distribution of radiation in the inspection region.

In some embodiments, the detector array may have no passive collimators or shields ("passive" meaning material that blocks a substantial fraction of incident particles, such as 5% or 10% of incident particles, and does not emit signals). The detector array may have a front surface and an opposite back surface, and may be configured to produce an image of radiation sources in front of the detector array. Hence, the "inspection region" may be a region in front of the detector array that is viewed by the detectors and by the camera. The detector array may include "protruding" detectors interleaved with "recessed" detectors, wherein the front surface of each protruding detector may be offset toward the front, relative to the front surfaces of the adjacent recessed detectors. Likewise, the front surface of each recessed detector may be recessed toward the back relative to the front surfaces of the adjacent protruding detectors. Each recessed detector may be surrounded by a plurality of adjacent protruding detectors which act as active (i.e., particle-detecting) collimators by blocking particles that arrive from various angles, thereby restricting the field of view of the adjacent recessed detector. For example, the protruding detectors may block particles that arrive at angles higher than a predetermined angle (termed a "cutoff angle") relative to the orientation direction of the adjacent protruding detectors. However, the protruding detectors may allow particles that arrive at lower angles to reach the adjacent recessed detector unhindered, so that the recessed detector's field of view is determined by the surrounding protruding detectors. For example, the tangent of the cutoff angle may be the thickness of the recessed detectors divided by the offset distance. Due to the active collimation, each recessed detector may have an unobstructed view of sources in a limited part of the inspection region, and may be blocked from detecting other particles arriving at angles above the cutoff angle. The processor may be configured to form a radiographic image showing the distribution of radiation sources in the inspection region, in which each pixel is based on the detection data of a corresponding one of the recessed detectors. "Detection data" may include a number or rate of detection events in which the signal exceeds a predetermined threshold, or a current or voltage, or other measure of the interactions of the particles with the detectors. The "composite image" may be an image formed by combining the photographic and radiographic images, such as by overlaying the radiographic data onto the photographic data, or by adding color or brightening or other parameter to the photographic pixels, or otherwise arranging to display the items in the inspection region together with the distribution of radiation detected.

In some embodiments, each protruding detector may have a different orientation direction, wherein the "orientation direction" of a protruding detector is the direction of its longest dimension. The various protruding detectors may have orientation directions that vary in both lateral directions, thereby spanning the inspection region in two dimensions. Each recessed detector may have a different "viewing direction," or field of view, which is determined by the orientation directions of the adjacent protruding detectors. The "offset distance" is the distance between the front surfaces of adjacent protruding and recessed detectors. The "length" of a detector is its longest dimension. The "thickness" of a detector is its smallest dimension, and the "width" is the intermediate dimension. The "central axis" of the detector array is a vector centered in both lateral directions of the detector array, and oriented in the back-to-front direction. A "source angle" is the angle between the central axis and a vector toward a particular source. The "angular sensitivity distribution" of a detector is the range of angles over which the detector is able to receive and detect incoming particles. An "edgemost" detector is a protruding or recessed detector at an edge of the detector array. "Secondaries" are charged particles resulting from an interaction of the particles from the source, such as Compton electrons or photoelectrons or electron-positron pairs from gamma ray interactions, or alpha particles or tritons or other ions from low-energy neutron capture reactions, or recoil protons from high-energy neutron scattering. The "lateral directions" are the two mutually-orthogonal directions perpendicular to the central axis. A "detection peak" is a set of detectors that have high detection rates, usually due to a source being positioned in alignment with those detectors.

In some embodiments, the protruding and recessed detectors may be stacked or assembled or positioned face-to-face in a two-dimensional array. The protruding and recessed detectors may be alternated in a checkerboard pattern, wherein in some embodiments, the "white" squares represent protruding detectors and the "black" squares represent recessed detectors, while in other embodiments the "white" squares represent recessed detectors and the "black" squares represent protruding detectors; other patterns are presented below. The detector array may be arranged in rows and columns along the two lateral directions. In some embodiments, the detector array may include at least 20 protruding and 20 recessed detectors (at least 40 in all), and may have at least 5 rows and at least 8 columns of detectors. In another embodiment, the detectors may be arranged in a hexagonal or honeycomb pattern, in which each recessed detector may be surrounded by 6 protruding detectors. The shape of the detector array may be flat, or curved ("arc-shaped") in one lateral direction such as the surface of a cylinder, or curved in both lateral directions such as the surface of a sphere, or other shape having curvature. The orientation directions of the protruding detectors may span the inspection region in both lateral directions. Accordingly, the recessed detectors, collimated by the protruding detectors, may view the inspection region two-dimensionally, and the processor may form a radiographic image based on the recessed detector data, showing the distribution of sources in the inspection region. In addition, the processor may form a second radiographic image based on the protruding detector data, and may combine the photographic image with one or both radiographic images to produce a composite image that shows the radiation distribution along with items in the inspection region.

Examples are presented for detecting gamma rays and neutrons, but the principles disclosed herein are readily applicable to other particle types as well. In applications involving clandestine radioactive threats, the ability to rapidly determine the distribution of radioactive sources in an inspection region is a major benefit.

FIG. 1 is a perspective sketch of an exemplary detector array 100 according to some embodiments, including protruding 101 and recessed 102 detectors. Each detector 101-102 may be configured to produce signals 113 upon detecting particles 111 from a radiation source 109, and to covey those signals 113 to a processor 114. The detectors 101-102 are shown positioned with their adjacent faces substantially in contact; other arrangements are described below. Each detector 101-102 is mounted on a curved surface 112, which in this case is a portion of a spherical surface with a generally square outline, viewed at an oblique angle from the rear. The protruding detectors 101 are oriented in a variety of directions. The front surfaces of the protruding detectors 101 are offset toward the front (to the right in the drawing) relative to the recessed detectors 102. Likewise, the front surfaces of the recessed detectors 102 are recessed toward the back by that offset distance 105. Thus, the offset distance 105 is the distance between the front surfaces of adjacent protruding and recessed detectors 101-102. Also indicated is the length 104 of the recessed detectors 102 and the length 103 of the protruding detectors 101. Also indicated is the thickness 107 of the protruding detectors 101, and the thickness 108 of the recessed detectors 102. As shown, the detectors 101-102 may have right prism shapes according to various embodiments, where each detector's width and thickness are the same. In other embodiments, each detector 101-102 may have a rectangular, tetragonal, hexagonal, circular, or other type of shape, and the recessed and protruding detectors 101, 102 may have different thicknesses and widths.

In some embodiments, the protruding and recessed detectors 101-102 may be interleaved, or otherwise placed successively in a two-dimensional pattern, so that each recessed detector 102 is at least partially surrounded by protruding detectors 101. In the depicted embodiment, the pattern is a checkerboard pattern in which each recessed detector 102 is surrounded by four adjacent protruding detectors 101, except for the edgemost detectors which are only partially surrounded. Each recessed detector 102 is collimated by the adjacent protruding detectors 101, since the protruding detectors block or at least partially block particles 111 that arrive from various directions, and in particular, particles that arrive at angles above the cutoff angle relative to the orientation direction of the adjacent protruding detectors 101. In this case, the cutoff angle is the arctangent of the width 108 of the recessed detectors 102 divided by the offset distance 105. Each recessed detector 102 has a relatively narrow field of view between the adjacent protruding detectors 101. Particles from a source that is positioned in alignment with a particular recessed detector may pass between the protruding detectors 101 and may be detected by the particular recessed detector. Particles arriving at larger angles, but less than the cutoff angle, may be partially obscured. Particles arriving at angles larger than the cutoff angle, relative to the orientation direction of the surrounding protruding detectors, are blocked. Thus, each recessed detector 102 views only, or primarily, whichever radiation sources are located within a restricted field of view, which is centered on the orientation direction of the surrounding protruding detectors and has a width determined by the cutoff angle. The amount of radiation detected by each particular recessed detector 102 is therefore related to (usually proportional to) the intensity of radioactive sources in that particular recessed detector's field of view. Taken together, the set of recessed detectors 102 thereby provides detection data spanning the inspection region in two lateral directions, thereby facilitating the generation of a two-dimensional radiographic image showing the distribution of sources in the inspection region.

In some embodiments, the back surface of each protruding detector 101 may be substantially coplanar with the back surfaces of the adjacent recessed detectors 102, as shown in the figure. "Substantially coplanar" means that the back surfaces of adjacent recessed 102 and protruding 101 detectors are at the same radial position to within a small distance such as 0.1 or 0.2 times the thickness 108 of the recessed detectors 102.

In other embodiments, the protruding and recessed detectors may be offset from each other in both front and back. For example, the protruding and recessed detectors may have the same length and shape, and the recessed detectors may be simply displaced toward the back relative to the protruding detectors. In that case, the distance between the back surfaces of the protruding and recessed detectors may be equal to the distance between their respective front surfaces, and the offset distance is the same in front and back. Examples are provided below.

In some embodiments, the detectors 101-102 may include a material suitable for detecting the particles and/or their charged secondaries. For example, the detectors 101-102 may include scintillators, semiconductors, and/or gaseous ionization types of detectors. Scintillators may include organic types such as organic crystalline (stilbene or anthracene, for example) or polymer (polyvinyltoluene PVT, for example) or liquid (based on mineral oil or other organic liquid, for example), or inorganic types such as NaI, BGO, LYSO, CsI, $CdWO_4$, $LaBr_3$, and scintillating glass among many other possibilities. For detecting neutrons, the detectors 101-102 may include a transparent matrix such as polycarbonate or polystyrene or acrylic or glass, which may be coated or loaded with a neutron-specific scintillator such as layered ZnS or scintillator microbeads, for example. The ZnS or the scintillator microbeads may contain or be adjacent to a neutron-capture nuclide such as lithium or boron, and may include lithium glass or borosilicate scintillator. Semiconductor detectors may include n-type or p-type reverse-biased junctions such as Si or CZT, optionally including a converter layer of hydrogenous material for neutron scattering, or a neutron-capture material such as boron or lithium, or a high-Z material for gamma conversion (Z being the atomic number). Gaseous ionization detectors may include proportional counters, Geiger tubes, or other gas-filled enclosures configured to collect ionization charges generated by the particles and/or their secondaries. The gaseous ionization detectors may include a converter material, such as a layer or coating of a high-Z material for Compton scattering of gamma rays, or a lithium or boron layer (or $BF_3$ or $^3He$ gas fill) for neutron capture reactions, or a hydrogenous layer for scattering of fast neutrons, for example. Responsive to detecting the particles, the detectors 101-102 may emit signals 113 such as electronic pulses which may be conveyed to the processor 114 for analysis. The processor 114 may be configured to receive the signals 113 and produce a radiograph or other two-dimensional image showing where the sources of radiation are distributed in the inspection region. The image may further include a visible-light or infrared photographic image showing the items being inspected. An icon or radiation map or other indicator may be added to the photographic image to indicate where the radioactive material is located among objects in the image. Alternatively, the items in the image may be modified by coloration or brightness, for example, to indicate which items are radioactive. The indicator and/or the modification may be configured to indicate the intensity of radiation detected for each direction or each item. For example, it may be colored or shaded according to the detection rate in the particular recessed detectors that view each direction or item. In addition, the indicator and/or modification may indicate the type of particle detected, such as one color for gamma radiation, a second color for low-energy neutron detection, and a third color for high-energy neutrons. The detectors 101-102 and/or the processor 114 may include optical and/or analog electronics to tailor the signals 113 for analysis, such as light sensors for scintillator detectors, amplifiers for semiconductor detectors, as well as transducers, filters, and the like.

In some embodiments, the detectors 101-102 may be configured to detect one particle type and to not detect another particle type, such as detecting neutrons but not gamma rays, or vice-versa. For example, ZnS scintillator is mainly sensitive to the dense tracks of neutron-capture ions and proton-recoil events, and is relatively insensitive to lightly-ionizing particles such as Compton electrons. For gamma detection, many inorganic scintillators such as NaI and BGO are efficient gamma detectors but nearly neutron-blind due to the low neutron-capture rates for the nuclides involved and the lack of recoil protons.

In some embodiments, the detectors 101-102 may be configured to detect two particle types, generating distinct signals. For example, such a detector could emit a first signal upon detecting the ions from a neutron interaction, and a second signal different from the first signal upon detecting electrons from a gamma ray interaction. The detectors may be configured to emit signals indicative of the particle type, such as PSD (pulse-shape discriminating) organic scintillators, or certain inorganic scintillators such as CsI and elpasolites that emit differently shaped pulses for gamma-generated electrons and neutron-generated ions. Alternatively, the processor 114 may be configured to identify neutron capture events in which two separate pulses occur in succession, corresponding to thermalization of the incident neutron, followed microseconds later by emission of neutron-capture ions.

In some embodiments, the processor 114 may be configured to reject events in which a signal 113 corresponds to an energy deposition greater than the maximum energy of the particles being sought. For example, most gamma rays and neutrons from nuclear materials have energies in the range of 1-3 MeV. A cosmic ray, on the other hand, traveling at nearly the speed of light, generally deposits energy at a rate of 2 MeV per gram of material in its path. In a plastic scintillator detector with a thickness 107 of 20 cm and density of 1 $g/cm^3$, cosmic rays deposit about 40 MeV and thus generate huge pulses, which can be eliminated by an energy cutoff.

In some embodiments, the processor 114 may be configured to reject events in which adjacent detectors fire at the same time or within a time window of, typically, 10-200 nsec depending on the time resolution of the detectors. Rejecting such coincident signals may reduce or eliminate events in which a particle scatters in one detector and then interacts in an adjacent detector.

In some embodiments, the thickness 107 of the protruding detectors 101 may be related to the average interaction distance of the particles 111 in the detector material. The average interaction distance is the distance that the particle 111 travels, on average, before being scattered or absorbed or otherwise interacting detectably with the material. For gammas, the average interaction distance is an inverse mass-attenuation factor. For energetic neutrons, the average interaction distance is an elastic scattering distance. For thermal or epithermal neutrons, the average interaction distance is a (projected) neutron-capture mean free path. In some embodiments, the protruding detector thickness 107 may be at least equal to the average interaction distance of the particles in the detector material. Alternatively, the protruding detector thickness 107 may be 2 or 3 or more times the average interaction distance, for greater blocking of particles and thus higher contrast in the final image.

In some embodiments, the offset distance 105 may be related to the recessed detector thickness 108. For example, the offset distance 105 may be at least equal to the thickness 108 of the recessed detectors 102, thereby providing a sufficiently narrow angular field of view of the recessed detectors 102. In other embodiments, the offset distance 105 may be 2 or 3 or 5 times the recessed detector thickness 108 or more, for improved angular resolution. A higher ratio results in a narrower angular field of view for each recessed detector 102 and therefore a better angular resolution.

The cutoff angle may be determined by the recessed detector width 108 divided by the offset distance 105. For example, the cutoff angle may equal the arctangent of the width 108 divided by the offset 105. In a particular case, when the offset 105 is three times the width 108, the cutoff angle is about 18 degrees. A particular recessed detector 102 is likely to detect particles that arrive at an angle of less than the cutoff angle (relative to the orientation of the surrounding protruding detectors 101), since those particles are likely to pass between the protruding detectors 101 and may thereby reach the particular recessed detector 102. In contrast, those particles that arrive at angles larger than the cutoff angle relative to the adjacent protruding detectors are likely to be blocked by the adjacent protruding detectors 101. Due to the collimation effect of the protruding detectors 101, the angular field of view of each recessed detector 102 is limited to directions that are within the cutoff angle or less, relative to the elongation direction of the surrounding protruding detectors 101.

In some embodiments, the lateral dimensions of the detector array 100 may be 0.1 to 0.5 meter to intercept a sufficient fraction of the emitted particles 111; in other embodiments the detector array lateral dimensions may be 1 meter for a greater solid angle, or 2 or 3 or 5 or 10 or 20 meters or more when needed to scan large objects. In some embodiments, the number of detectors may total at least 25 to provide sufficient spatial resolution, and more preferably at least 40 detectors for a larger total field of view, and may be 200 or 500 or 1000 or more detectors in a large inspection installation. Four exemplary embodiments are presented below for detecting particular particle types.

In a first exemplary embodiment, intended for imaging gamma rays, the detectors 101-102 may include an organic scintillator, such as liquid scintillator or PVT-based plastic scintillator, configured to detect 1-2 MeV gamma rays by Compton scattering. High-energy neutrons may also be detected by elastic n-p scattering. The detector array lateral dimensions may be 2.4 meters by 15 meters, the detector thicknesses 107-108 may be 15 cm, the total number of detectors may be 1600. The offset distance 105 may be 25 cm, thereby providing a detection area of 36 square meters and a weight (not including accessories discussed below) of about 19 tons.

In a second exemplary embodiment, intended for detection of 100-500 keV gamma rays but not neutrons, the detectors 101-102 may include BGO scintillator. The detector array lateral size may be 0.25 meter square, the detector thickness 107-108 may be 1 cm, the total number of detectors may be 625, and the offset distance 105 may be 1 cm, thereby providing a detection area of 625 square cm and a total weight of about 8 kg.

In a third exemplary embodiment, for detection of neutrons, the detectors 101-102 may include a PMMA (polymethylmethacrylate) matrix loaded with scintillating microbeads containing ZnS or other scintillator, along with lithium or boron neutron-capture targets, and configured to detect slow neutrons by capture as well as fast neutrons by moderation and capture. Alternatively, the detectors 101-102 may include a PSD organic scintillator with a fluor that produces different pulse shapes for electrons and ions, thereby selecting neutron interactions. In either case, the detector array lateral size may be 4×20 meters, the detector thickness 107-108 may be 10 cm, the total number of detectors may be 8000, the offset distance 105 may be 20 cm, with a detection area of 80 square meters and a weight of about 20 tons.

In a fourth exemplary embodiment, for detection of low-energy neutrons, the detectors 101-102 may include gaseous ionization detectors with enclosures containing a neutron-capture nuclide, a wire grid at high positive voltage, and a gas that promotes electron drift toward the wire grid when ionized by an energetic particle. For example, the gas may include $^3$He or $BF_3$, thereby including neutron-capture nuclides. Alternatively, the walls of the enclosure may be coated with LiF, $B_4C$, boron metal, or another neutron-capture compound. Other surfaces, such as electrodes including aluminum or a different conductor may be coated on one or both sides with neutron-capture compounds. Preferably such coatings are thin enough to allow neutron-capture ions (such as tritons and alpha particles) to escape through the coating into the gas, thereby generating an ionization pulse that indicates the detection of a low-energy neutron. The detector array may have a lateral size of 3×12 meters and an overall longitudinal dimension of 1 meter, thereby providing a detection surface area of 36 square meters and a weight of about 1 ton, assuming aluminum/plastic construction.

Figure 2:
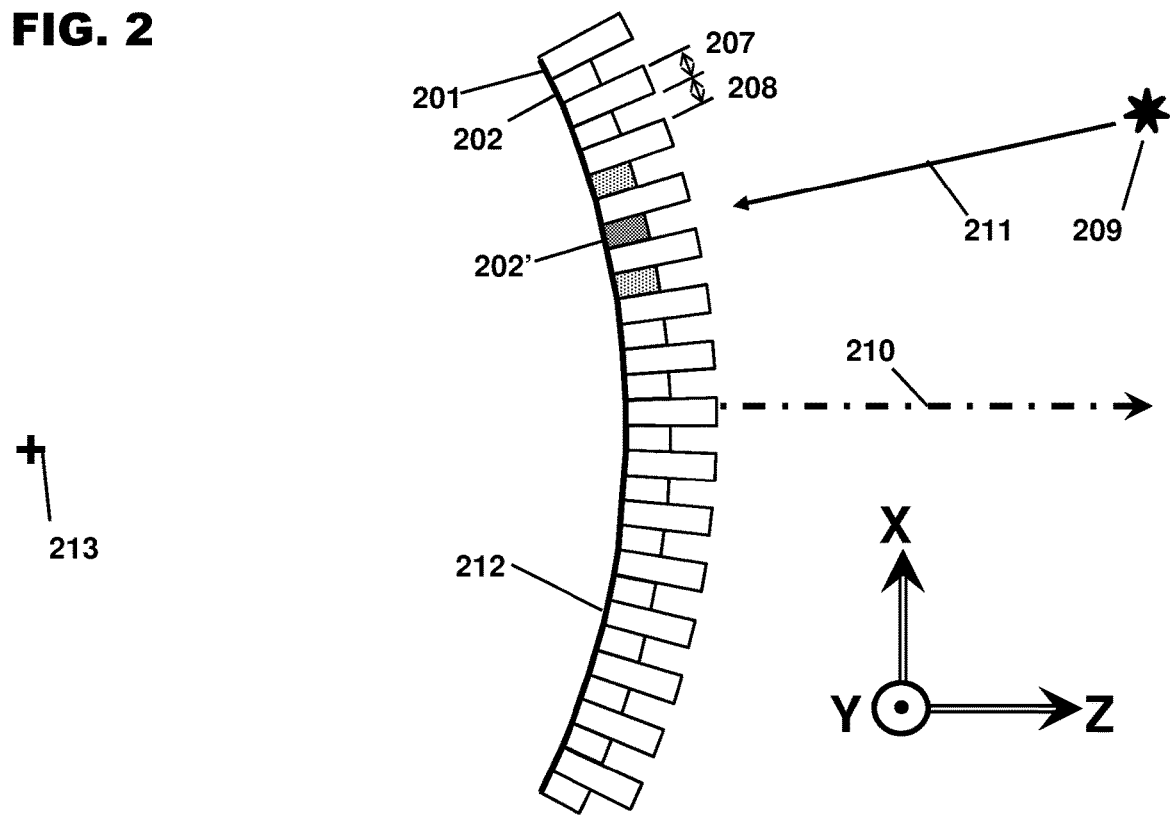
FIG. 2 is a cross-section sketch of an exemplary detector array including recessed and protruding detectors and a radioactive source, according to some embodiments.

FIG. 2 is a cross-section sketch of an exemplary detector array showing protruding detectors 201 alternating with recessed detectors 202 mounted on a curved surface 212 and aligned radially relative to a focal point 213 behind the detector array. The thickness of the protruding detectors 201 is labeled 207 and the thickness of the recessed detectors 202 is labeled as 208. The recessed detectors 202 are shorter than the protruding detectors 201 by a distance at least equal to the thickness 208 of the recessed detectors 202. A source 209 is shown in front (to the right) and is emitting particles 211. A particular recessed detector 202' is directly aligned with the source 209, and therefore detects the particles 211 unobscured by the protruding detectors 201. The particular recessed detector 202' therefore has a high detection rate as indicated by the dark stipple fill. The other recessed detectors 202 are either partially or completely blocked by the protruding detectors 201, and therefore have lower detection rates as shown in medium stipple or clear. The distribution of detections in the various recessed detectors 202 thus exhibits a narrow detection peak, or region of enhanced detection, with a maximum detection rate in the particular recessed detector 202' that is directly aligned with the source 209. The lateral position of the detection peak in the recessed detectors 202 thereby indicates the direction or angle of the source 209. If multiple sources are present, the corresponding recessed detectors that are directly aligned with the respective sources exhibit high counting rates according to the radioactivity of each source or source region in view. If the source is distributed across an area, the detection rate in each recessed detector 202 is related to, or proportional to, the amount of radioactivity in each recessed detector's field of view. In this way the recessed detector detection rates reveal the distribution of radiation, including the locations and shapes of various sources in the inspection region. For example, if radioactive material is distributed across an area, such as a barrel filled with radwaste for example, then the various recessed detectors that are aligned with portions of the barrel have high counting rates, whereas the other recessed detectors aimed elsewhere are partially or totally obscured relative to particles emitted from the barrels. The processor can thus form a radiation image, radiograph, or radiation density map according to the detection rates of the corresponding recessed detectors.

The protruding detectors 201 also detect the particles 211, but unlike the recessed detectors 202, the protruding detectors 201 generally have a much broader detection distribution since the protruding detectors 201 directly face the source 209 without collimation according to some embodiments. In general, each protruding detector 201 may have a detection rate proportional to its geometrical area as viewed by the source 209, and consequently the detection distribution of the protruding detectors 201 may be much wider than the narrow detection peak of the recessed detectors 202. On the other hand, the protruding detectors 201 generally have higher detection efficiency than the recessed detectors 202 due to the greater angular field of view of the protruding detectors 201. Therefore, the distribution of detections in the protruding detectors 201 may provide valuable information about the source distribution, which may be used to enhance or augment an image based on the recessed detector 202 detection rates. For example, the processor may be configured to determine the angle or direction or distribution or image of the source or sources according to the detection rates in the recessed detectors, and may also prepare an additional distribution or image according to the detection rates in the protruding detectors. The processor may prepare an image in which the detection data of the recessed and protruding detectors are combined, such as by weighted averaging to emphasize the recessed detector data over the broader protruding detector data. Additionally, a deconvolution algorithm may be applied to the protruding detector distribution, and optionally to the recessed detector data as well, thereby extracting a sharper image of the source distribution. The processor may also correct for certain distortions such as edge effects using, for example, a predetermined correction function related to the position of each recessed or protruding detector.

If a source is located outside the direct field of view of the array (that is, the source is located so far from the central axis 210 that none of the recessed detectors 202 is aligned with the source), then an edgemost detection peak is generally produced, yielding enhanced detections in whichever detectors are at the edge of the detector array (that is, "edgemost" detectors) closest to the source. For example, if the source is located beyond one edge of the detector array field of view, then the detectors 201-202 at that edge of the array, closest to the source position, generally receive most of the particles, or at least more counts than the adjacent detectors 201-202 which are shielded by that edgemost detector or detectors. The high-counting edgemost detector may be either the protruding or recessed type, depending on the construction of the particular detector array. The processor may determine that a source is present when the high-counting detector is an edgemost detector, and may further determine that the source is outside the field of view of the detector array, and also that the location of the high-counting edgemost detector indicates the general direction of the source (although not the specific location of the source).

Figure 3:
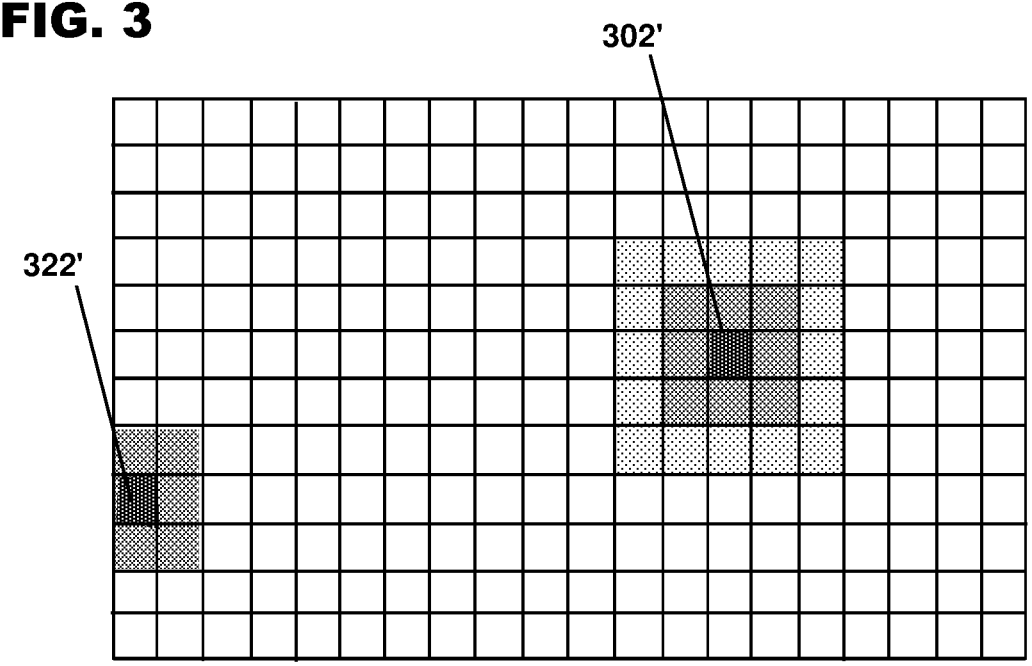
FIG. 3 is a notional sketch of an exemplary image produced by two radioactive sources, according to some embodiments.

FIG. 3 is a notional front-view sketch of the recessed detectors of an exemplary detector array, showing only the recessed detectors, and with the curvature suppressed. Dark stipple fill indicates a particular recessed detector 302' that is directly aligned with a source, has a high detection rate, and thereby indicates the source direction. A second recessed detector 322' is an edgemost detector with a high detection rate. This second high-counting recessed detector 322' indicates that a second source is present and is located somewhere to the left side of the array as viewed here. The two-dimensional distribution of counting rates of the various recessed detectors thus yields a radiograph that shows the two-dimensional distribution of particle emitters in the direct field of view of the recessed detectors, and also indicates the presence and general direction of other sources that are not in the direct field of view. Alternatively, an edgemost protruding detector with a detection rate higher than its neighbors can also indicate the presence of a source outside the direct field of view of the detector array. For example, if the edgemost detectors are protruding detectors, then particles from the source may interact primarily with the edgemost protruding detector that is closest to the source, and the recessed detectors may be shielded by the protruding detectors. In that case, the processor may be configured to add the high-counting protruding detector data to the composite image, or otherwise indicate that another source is present off the corresponding edge, even though the recessed detectors failed to see it.

Although the drawing is in black and white, the composite image can be configured to convey a variety of information using colors, according to some embodiments. Besides the lightness or darkness, the pixels can be colored to indicate radiation intensity, or the detected particle type, or the particle energy, or other information. In addition, the radiation indicators can be caused to flicker or otherwise be temporally modulated to convey further information, such as indicating that the radiation levels from the flickering source have reached a hazardous level, or that a source indicated in red is a neutron emitter, for example.

Figure 4:
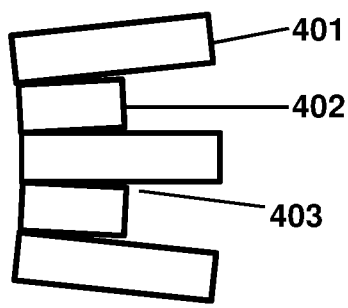
FIG. 4 is a cross-section sketch showing how an exemplary detector array can be assembled from rectangular detectors, according to some embodiments.

FIG. 4 is a cross-section sketch of a portion of an exemplary detector array including protruding 401 and recessed 402 detectors. Each detector 401-402 is a right square prism shape with parallel sides, elongated in an extrusion direction, and therefore appears rectangular in this cross-section view. Adjacent detectors are rotated by a small angle relative to each other, so that each detector 401-402 is oriented in a different direction. Due to the small angular difference between adjacent detectors, they are not in face-to-face contact, but are separated by a small triangular air gap 403. In most embodiments, the relative angle between adjacent detectors is small and the air gap 403 has no significant effect on performance.

Figure 5:
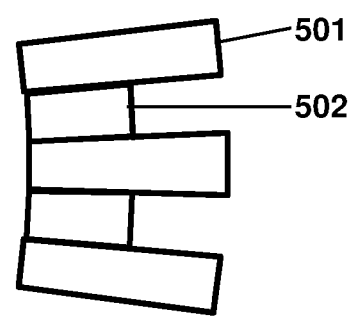
FIG. 5 is a cross-section sketch showing how an exemplary detector array can be assembled from trapezoidal detectors, according to some embodiments.

FIG. 5 is a cross-section sketch of a portion of an exemplary detector array including protruding 501 and recessed 502 detectors which are slightly tapered or trapezoidal shaped, so that they fit together face-to-face without a triangular air gap. The tapered shape may make it easier to assemble and support the detectors 501-502 since they can be stacked together. In a practical implementation, the detectors 501-502 may be separated by inert materials such as foil, tape, insulators, chamber walls, or the like, all of which will be disregarded herein.

Figure 6:
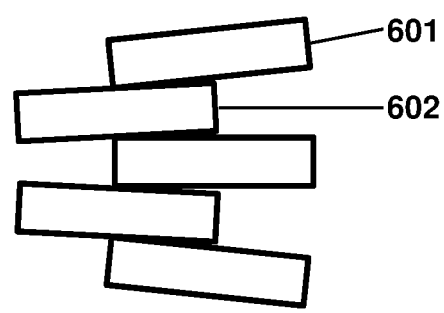
FIG. 6 is a cross-section sketch showing how an exemplary detector array can be assembled by displacing two sets of rectangular detectors radially, according to some embodiments.

FIG. 6 is a cross-section view of a portion of an exemplary detector array including protruding detectors 601 and recessed detectors 602, each of which is a non-tapered (parallel-sided) prism shape shown as a rectangle. The protruding and recessed detectors 601-602 have the same size and shape in this case, in contrast to the previous examples in which the recessed detectors were shorter than the protruding detectors. In the embodiment of FIG. 6, the protruding detectors 601 are displaced toward the front and the recessed detectors 602 are displaced toward the back, thereby providing an offset between the protruding and recessed detectors 601-602. The offset distance in the back is the same as the offset in the front. Such a detector array can be built from detectors 601-602 all having the same dimensions, a potential simplification.

Figure 7:
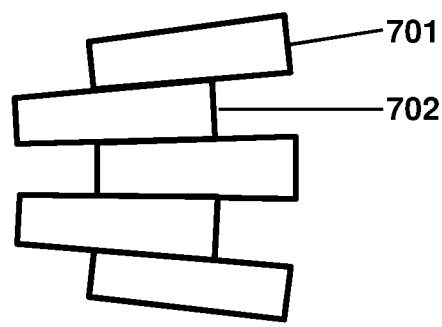
FIG. 7 is a cross-section sketch showing how an exemplary detector array can be assembled by displacing two sets of trapezoidal detectors radially, according to some embodiments.

FIG. 7 is a cross-section view of a portion of an exemplary detector array including protruding detectors 701 and recessed detectors 702, each of which has the same size and shape such as a tapered or trapezoidal in shape. The recessed detectors 702 are displaced rearward relative to the protruding detectors 701. The detectors 701-702 may fit together face-to-face, simplifying assembly and support.

Figure 8:
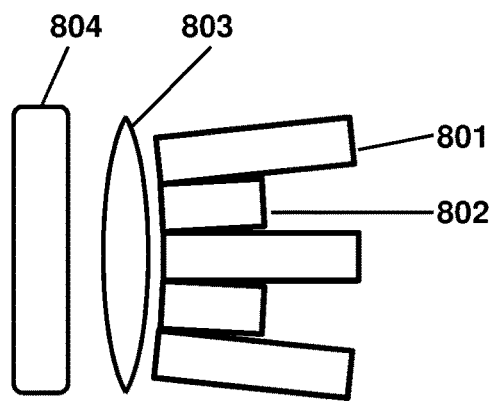
FIG. 8 is a cross-section sketch showing how an exemplary detector array can be read out using optics, according to some embodiments.

FIG. 8 is a cross-section view of a portion of an exemplary detector array including protruding detectors 801 and recessed detectors 802 which, in this embodiment, include scintillators. To convert scintillation light into an electrical signal, the embodiment includes a position-dependent light sensor 804 such as a multi-anode microchannel plate or a CCD, either of which may also include a light amplifier. The embodiment further includes an optical system 803, represented as a lens, configured to collect scintillation light from each detector 801-802 and focus it on the light sensor 804. The light sensor 804 then produces an electrical signal or a series of signals that indicate which of the detectors 801-802 detected a particle.

Figure 9:
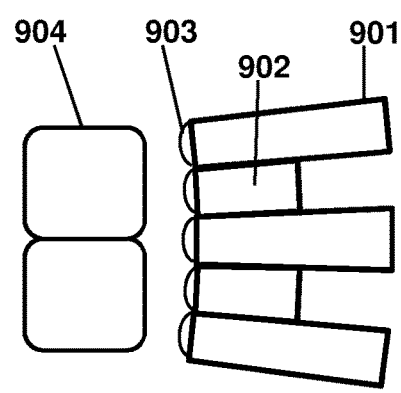
FIG. 9 is a cross-section sketch showing how an exemplary detector array can be read out using phototubes, according to some embodiments.

FIG. 9 is a cross-section view of a portion of an exemplary detector array including protruding detectors 901 and recessed detectors 902 which in this embodiment include scintillators. Small optical elements such as lenses 903 mounted on each detector 901-902 focus scintillation light onto two conventional (that is, NOT position-sensitive) photomultiplier tubes 904, which are configured to produce electrical signals proportional to the amount of light that each respective tube 904 receives. Each photomultiplier tube 904 is positioned to receive a different amount of light from each of the detectors 901-902, so that the ratio of light received by the two tubes 904 indicates which of the detectors 901-902 was active. In analysis, the signals from the two photomultiplier tubes 904 may be compared and the ratio of signals determined, which thereby indicates which of the detectors 901-902 detected a particle.

Figure 10:
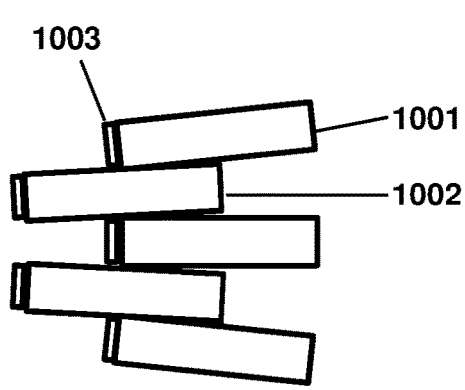
FIG. 10 is a cross-section sketch showing how an exemplary detector array can be read out using solid-state sensors on the back of each detector, according to some embodiments.

FIG. 10 is a cross-section view of a portion of an exemplary detector array including protruding detectors 1001 and recessed detectors 1002 along with sensors 1003 attached to each detector 1001-1002. The sensors 1003 are configured to produce signals that the processor can receive. For example, if the detectors 1001-1002 are scintillators, the sensors 1003 may be solid-state light sensors such as avalanche photodiodes or the like. If the detectors 1001-1002 are semiconductor detectors or gaseous ionization type detectors, then the sensors 1003 may be amplifiers, filters, and/or related electronics. In the depicted embodiment, the sensors 1003 are shown mounted at the back surface of each detector 1001-1002, which thereby avoids blocking incoming particles from the front (to the right in the sketch).

Figure 11:
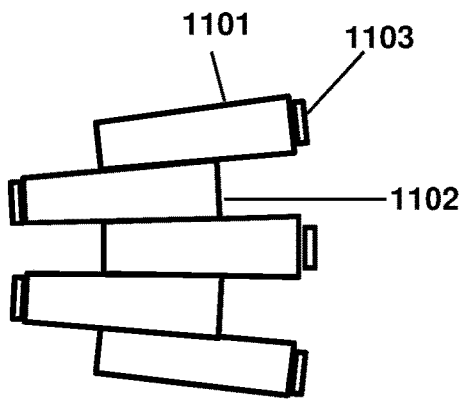
FIG. 11 is a cross-section sketch showing how an exemplary detector array can be read out using solid-state sensors on both front and back sides, according to some embodiments.

FIG. 11 is a cross-section view of a portion of an exemplary detector array including tapered protruding detectors 1101 and recessed detectors 1102 along with sensors 1103. In this embodiment, each sensor 1103 is mounted on the respective front surface of each protruding detector 1101 or on the back surface of each recessed detector 1102. With such mounting, the sensors 1103 may be more easily accessible for assembly, maintenance, etc. Some sensors 1103 can be made small enough and thin enough that they intercept negligible incoming particles.

Figure 12:
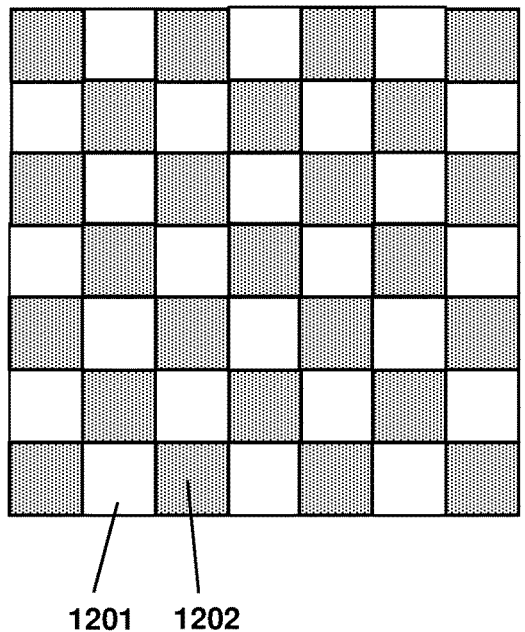
FIG. 12 is a notional front-view sketch of an exemplary detector array showing recessed and protruding detectors in a checkerboard pattern, according to some embodiments.

FIG. 12 is a notional front-view sketch showing an exemplary detector array with protruding 1201 and recessed 1202 detectors in a checkerboard pattern. Each recessed detector 1202 is surrounded on four sides by protruding detectors 1201 (other than the edgemost detectors which are only partially surrounded). Thus, the protruding detectors 1201 serve as active collimators for the recessed detectors 1202, thereby limiting the field of view of each of the recessed detectors 1202. Due to that collimation, the detection data of the recessed detectors 1202 indicates the distribution of radiation sources in front of the detector array.

Figure 13:
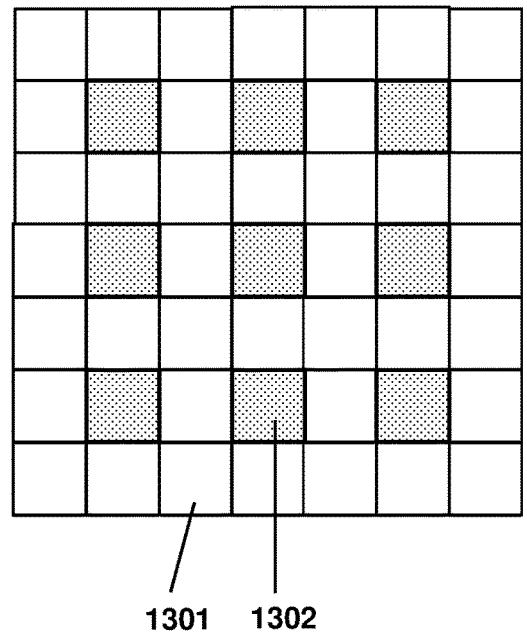
FIG. 13 is a notional front-view sketch of an exemplary detector array showing recessed and protruding detectors in a centered pattern, according to some embodiments.

FIG. 13 is a notional front-view sketch showing an exemplary detector array with protruding 1301 and recessed 1302 detectors in a "centered" type of arrangement, in which each recessed 1302 detector is surrounded by eight of the protruding detectors 1301, thereby providing even greater collimation.

As another alternative, the detectors may be in a hexagonal pattern in which each recessed detector is surrounded on 6 sides by protruding detectors. The hexagonal arrangement generally provides greater collimation, but with a reduction in the number of recessed detectors in the array.

Figure 14:
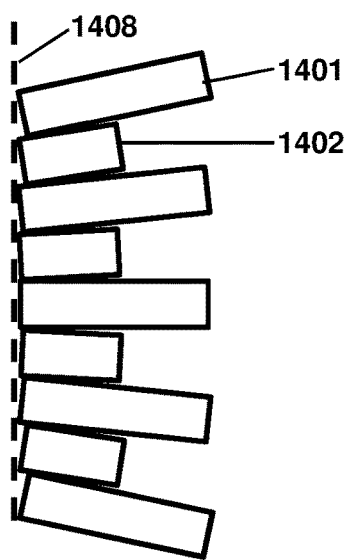
FIG. 14 is a cross-section sketch of a portion of an exemplary detector array with a flat or planar shape.

FIG. 14 is a cross-section sketch of an exemplary detector array in which the protruding 1401 and recessed 1402 detectors are right regular prism shapes and are positioned abutting a planar surface 1408 in back. This is in contrast to the foregoing examples in which the overall shape of the detector array was arc-shaped. Each detector 1401-1402 is oriented at a slightly different angle, and therefore each recessed detector 1402 has an unobstructed view of a different region of space in the inspection region, which is to the right. The flat-back design as depicted may be simpler to build and/or more compact than a curved design.

Figure 15:
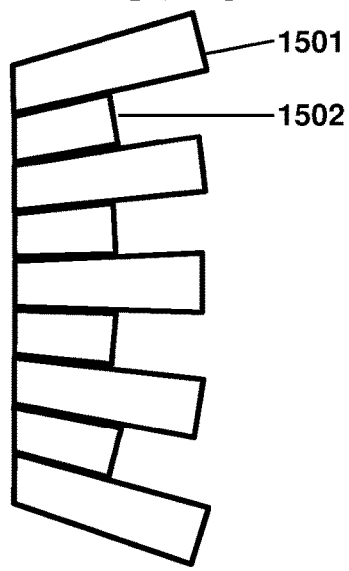
FIG. 15 is a cross-section sketch of a portion of another exemplary detector array with a flat or planar shape.

FIG. 15 is a cross-section sketch of another exemplary detector array with a flat back surface. Here the protruding 1501 and recessed 1502 detectors are tapered, and their back surfaces are shaped and positioned so that their back surfaces are coplanar. The configuration of FIG. 15 may be easier to build and support since the detectors are tapered and shaped to fit face-to-face.

Figure 16:
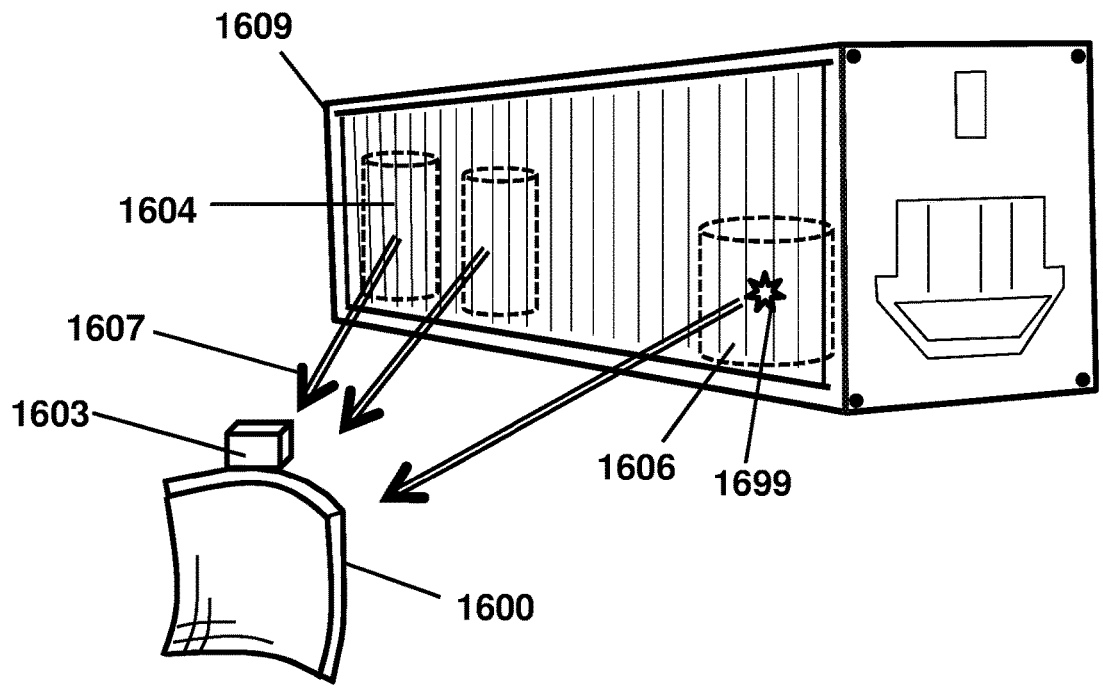
FIG. 16 is a perspective sketch showing how an exemplary detector array can scan a shipping container, according to some embodiments.

FIG. 16 is a perspective sketch of an inspection scenario in which an exemplary detector array 1600 is shown inspecting a shipping container 1609 for radioactive material. The shipping container 1609 contains two barrels 1604 of radwaste, which were legally declared on a manifest. However, in an attempt to get past the inspection, an adversary has also hidden a clandestine nuclear weapon 1699, encased in a heavy shield 1606. The adversary assumed that radiation detectors would detect the declared material 1604 and would miss the weapon 1699 entirely. Fortunately, the inspection uses an imaging detector array 1600 which detects particles 1607 from the radwaste 1604 and also separately detects those from the weapon 1699. The detector array 1600 then produces a radiation image that shows all the sources in view. At the same time, a camera 1603 mounted on the detector array 1600 records the scene in visible light, to document the locations of any sources detected. Although the shield 1606 greatly reduces the amount of radiation from the weapon 1699, the large surface area and high detection efficiency of the detector array 1600, and the inherent directionality of the recessed detectors of the detector array 1600, reveal the weapon 1699. The resulting image is further illustrated in FIG. 17.

Figure 17:
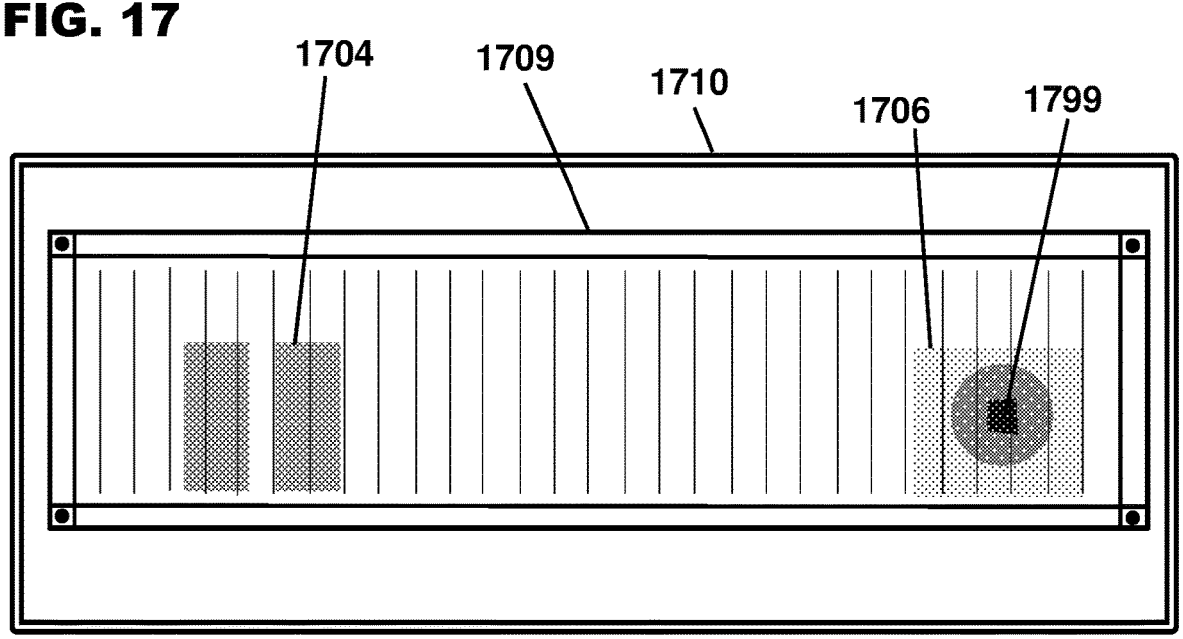
FIG. 17 is a notional sketch of an exemplary image showing multiple radiation sources, according to some embodiments.

FIG. 17 is a sketch of an exemplary composite image 1710 produced from the inspection scenario of FIG. 16, in which the radiation distribution is overlain onto the visible-light photographic image. The composite image 1710 thereby shows where each source is located in the shipping container 1709. Depending the size of a source and the angular resolution of the recessed detectors, the image 1710 may also indicate the shape and distribution of each source. The two radwaste barrels 1704 show up clearly in the shipping container 1709. In addition, the clandestine weapon 1799 appears as a point-like source, as indicated by a sharp detection peak in the particular recessed detector that is directly aligned with the weapon 1799. The shield 1706 also shows up, due to scattered radiation. Thus the composite image 1710 reveals the weapon 1799, and the detector array 1600 has successfully defeated an adversary's attempt to transport clandestine radioactive material.

As an option, the type of particle detected may be rendered as a color or other feature of the radiation overlay on the composite image 1710. For example, the radiation from radwaste is usually gamma rays, whereas most weapons emit neutrons. Accordingly, the radiation overlay corresponding to gammas from the barrels 1704 may be rendered in yellow to indicate gamma detection, while the weapon 1799 overlay may be rendered in red to indicate neutrons.

Figure 18:
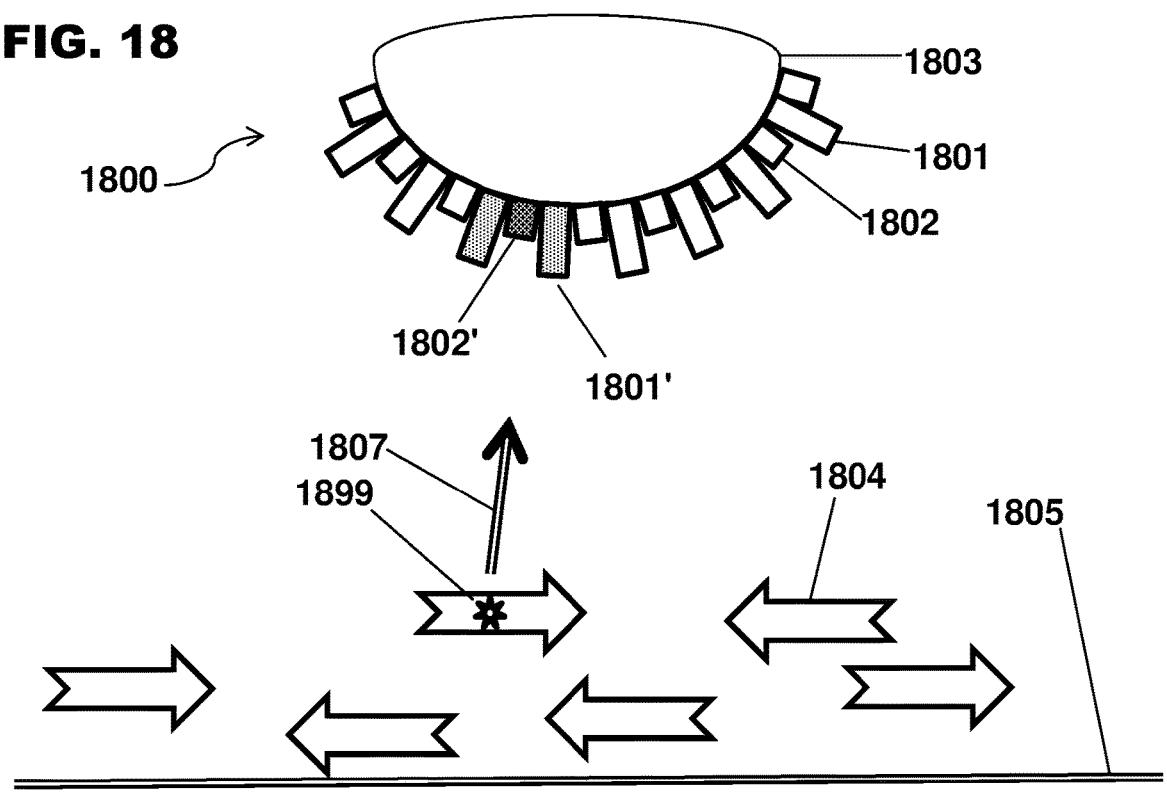
FIG. 18 is a notional sketch of an exemplary detector array mounted on a ceiling to scan passing pedestrians for radiation, according to some embodiments.

FIG. 18 is a notional sketch of an exemplary detector array 1800 mounted over a passageway 1805 and configured to scan passing entities 1804 (indicated by arrows) such as pedestrians, vehicles, cargo, baggage, or the like, and to image the detected radiation sources in real-time. The detector array 1800, shown in cross-section, is mounted over the passing entities 1804, for example mounted on a ceiling, gantry, overpass, or other overhead structure. Alternatively, the detector array 1800 may be mounted on or under the passageway 1805, or on a side wall or other mounting structure. The detector array 1800 includes protruding 1801 and recessed 1802 detectors interleaved or alternated, and mounted on a hemispherical mounting surface 1803 with each detector 1801-1802 being oriented perpendicular to the local surface of the hemispherical mounting surface 1803, so that each protruding detector 1801 is oriented in a different direction including both lateral directions. Each recessed detector 1802 is thereby collimated to view a different region of space, and an image of the radiation distribution can be formed from the detection rates of the recessed detectors 1802. In addition, by acquiring and processing the detection data in real-time, a moving image of the radiation field can also be formed, thereby detecting a moving source, as is expected for entities 1804 in motion.

One of the moving entities 1804 is carrying concealed radioactive material 1899 which is emitting particles 1807. At the particular moment depicted, a particular recessed detector 1802' is aligned with the radioactive material 1899 and therefore has an unobstructed view of the arriving particles 1807. The particular recessed detector 1802' therefore has a higher counting rate than the other detectors as indicated by a dark stipple fill. An image formed from the detection rates of the recessed detectors 1802 can thus detect the radioactive material 1899, and can also indicate its location at a particular moment. When analyzed with radiation images acquired at different times, the direction of travel and speed of the entity 1804 carrying the radioactive material 1899 can be determined.

The sketch also shows which particular protruding detectors 1801' register high detection rates since they have a direct view of the particles 1807, whereas the other protruding detectors 1801 are partially or almost completely shielded by their neighbors due to the curvature of the mounting surface 1803. Accordingly, a second radiation image can be prepared based on the detection rates of the protruding detectors 1801. The second radiation image can indicate the presence, speed, and direction of travel of the radioactive materials 1899, thereby confirming the results of the recessed detectors 1802. The radiation image of the protruding detectors 1801 is expected to have substantially lower (broader) spatial resolution than the radiation image of the recessed detectors 1802, due to the lack of active collimation among the protruding detectors 1801. On the other hand, the statistical power of the protruding-detector image can be quite high due to the larger number of protruding detectors 1801 positioned to detect the particles 1807. Therefore both the recessed-detector data and the protruding-detector data may be useful in detecting and localizing the radioactive material 1899.

Figure 19:
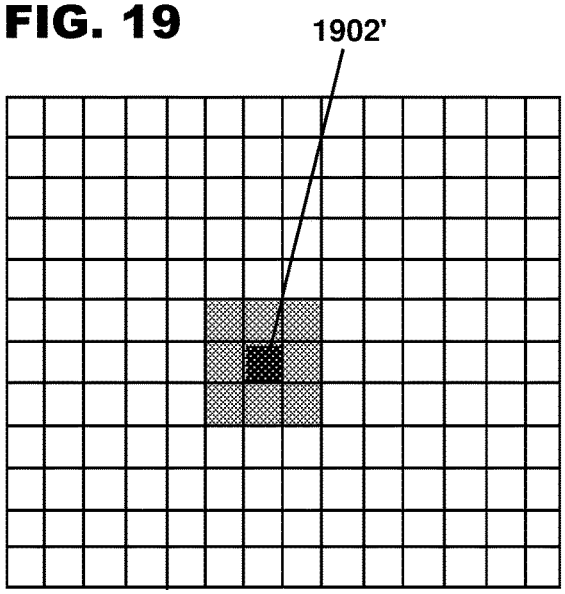
FIG. 19 is a notional sketch showing an exemplary distribution of detection data in recessed detectors, according to some embodiments.

FIG. 19 is a notional front view sketch of the detector array 1800 of FIG. 18, with the curvature suppressed and the protruding detectors averaged over so that only the recessed detector rates are shown. A particular element 1902' is shown heavily stippled, corresponding to the particular recessed detector 1802' that is directly aligned with the radioactive materials 1899. Thus the distribution of detection rates in the recessed detectors 1802 can form the basis for a two-dimensional radiographic image showing the distribution of radiation sources in view of the detector array 1800.

Figure 20:
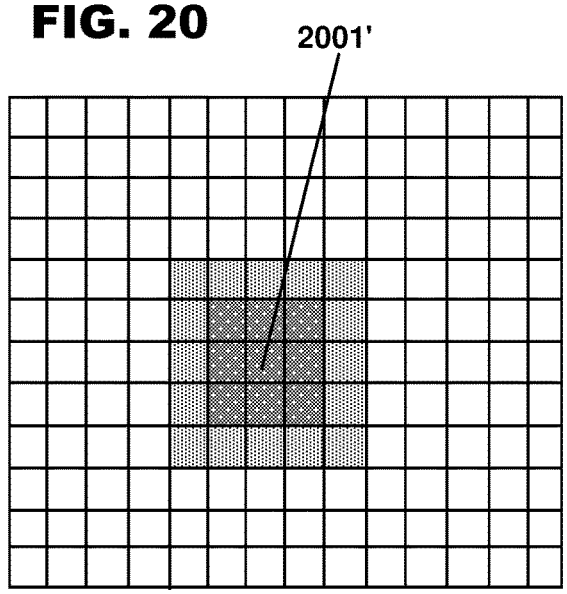
FIG. 20 is a notional sketch showing an exemplary distribution of detection data in protruding detectors, according to some embodiments.

FIG. 20 is a notional front view of the detector array 1800 of FIG. 18, but this time with the recessed detectors averaged over so that only the protruding detector rates are shown. A particular set of elements 2001' are shown darkened, corresponding to the particular protruding detectors 1801' that are most exposed to the particles 1807 from the radioactive materials 1899. Thus the distribution of detection rates in the protruding detectors 1801 can form the basis for a two-dimensional radiographic image showing the distribution of radiation sources in view of the detector array 1800. As is apparent, the spatial resolution of the protruding detectors 1801 is much less (that is, wider) than that of the recessed detectors 1802. The protruding detector resolution is due to the overall curvature of the mounting surface 1803, whereas the recessed detector resolution is due to the collimation from the adjacent protruding detectors, which limit the field of view of each recessed detector. On the other hand, the number of protruding detectors that contribute to the detection distribution of FIG. 20 is larger than the number of recessed detectors contributing to the detection distribution of FIG. 19. Therefore the detection data of the protruding detectors may be statistically significant, particularly when the source is weak.

In some embodiments, the processor may be configured to exploit the detection data from both types of detectors, recessed and protruding. The processor may be configured to combine the data from the recessed and protruding detectors respectively, and thereby produce a more informative composite image than obtainable from each type of detector separately. The processor may also be configured to apply a deconvolution algorithm to each set of data, thereby sharpening the resulting radiographic image, using deconvolution technology well known in image processing fields. Due to the different properties of the recessed and protruding detector data, the processor may use a different deconvolution template for the two data sets. The processor may be further configured to combine the deconvoluted distribution of the recessed detectors with the deconvoluted distribution of the protruding detectors, and thereby prepare a radiographic image with better sensitivity and lower noise than could be obtained with either distribution alone.

In some embodiments, the deconvolution template may be based on the angular sensitivity distribution of the recessed detectors. The angular sensitivity distribution is a function that corresponds to the distribution of detections among the recessed (or protruding) detectors when exposed to a single isolated point-like source of radiation. The angular sensitivity distributions of the respective recessed and protruding detectors may be determined by placing a test source in front of a detector array and recording the distribution of detection rates in the two types of detectors. Alternatively, the angular sensitivity distributions may be determined by simulation, for example using software such as MCNP or GEANT, with a simulated isotropic point source. The distribution of detections in the recessed detectors is determined primarily by the offset distance and the width of each recessed detector, due to the active collimation provided by the protruding detectors. If the angular sensitivity distribution of each recessed detector is known, then the recessed detector radiographic image can generally be sharpened by applying a deconvolution algorithm. Likewise, the angular sensitivity distribution of the protruding detectors is primarily determined by the exposed area of each protruding detector as viewed by the source. Many deconvolution algorithms are known, usually based on two-dimensional Fourier transformations, particularly in the field of image processing. The recessed detector radiographic image may then indicate the distribution of sources more clearly after the deconvolution algorithm is applied to the recessed detector data, and likewise for the protruding detector radiographic image.

In some embodiments, the recessed detector radiographic image (optionally with deconvolution) and the protruding detector radiographic image (optionally with deconvolution) may be combined to obtain an even sharper and/or more nuanced total radiographic image with higher quality than either component alone. In addition, the total radiographic image can be overlaid, or otherwise combined, with a visible-light (or infrared) image of the inspection scene, so that the final combined two-dimensional image can show where the radioactive sources are located. For example, in an inspection involving numerous items such as mixed cargo, or numerous separate items such as passing vehicles, and in many other cases, the combined image can indicate which of the items contains radioactive material.

Figure 21:
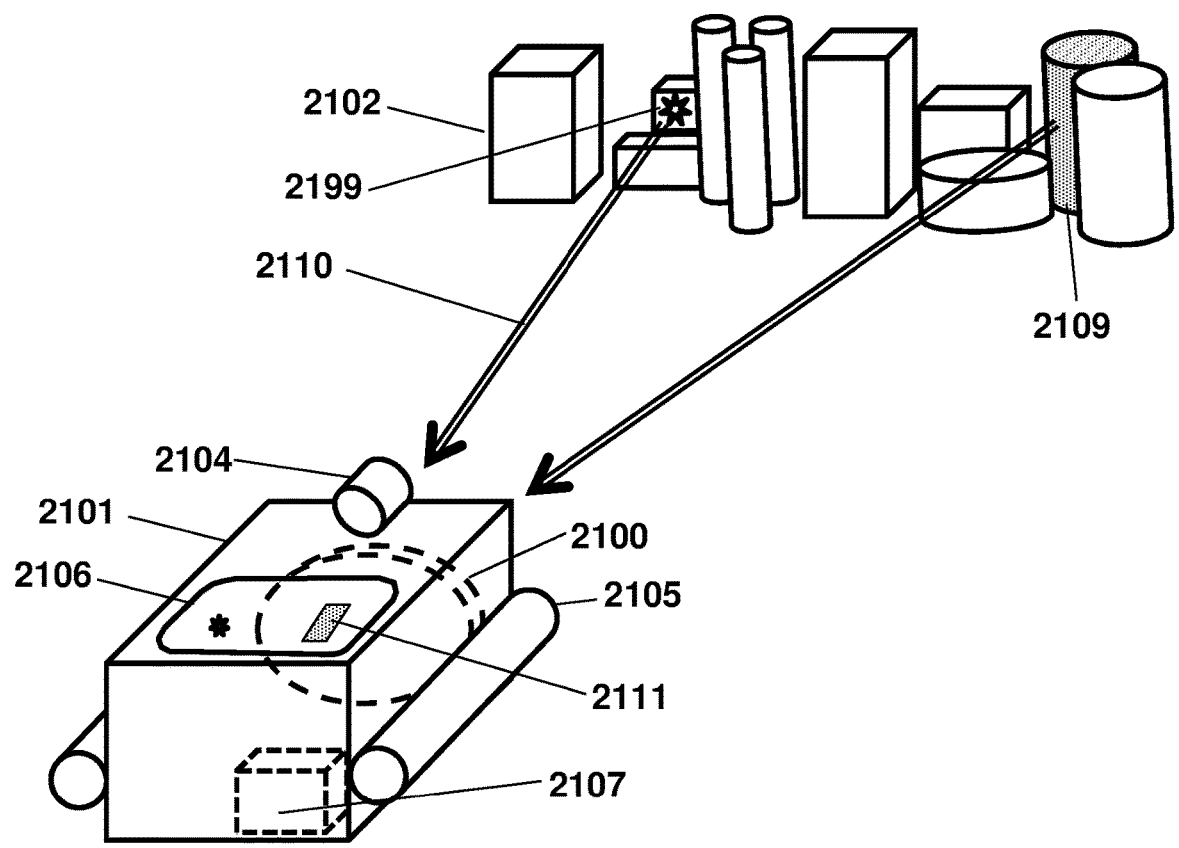
FIG. 21 is a notional sketch of an exemplary portable radiation imager scanning cargo for radiation, according to some embodiments.

FIG. 21 is a perspective sketch of an exemplary portable imaging radiation detector 2101 inspecting some cargo 2102 for radioactive contraband. The depicted imaging radiation detector 2101 includes an imaging detector array 2100 (hidden, dashed), a visible-light and/or infrared camera 2104, carrying handles 2105, a flat-screen display 2106, and a processor 2107 (hidden, dashed). The cargo 2102 includes a radiological weapon 2109 and the core of a plutonium weapon 2199, both of which produce particles 2110 such as gamma rays and/or neutrons, which the detector array 2100 is configured to detect.

The processor 2107 in the depicted embodiment is configured to prepare a composite image that includes both the cargo items 2102 and the distribution of sources 2109, 2199 in the inspection region. The flat-screen display 2106 is configured to show the composite image, including the scene as observed by the camera 2104, overlain or otherwise combined with a radiation distribution based on data from the imaging detector array 2100. The imaging radiation detector 2101 thereby provides an image 2111 indicating which of the cargo items 2102 includes a radiological weapon 2109 and a nuclear pit 2199. In addition, the processor 2107 is configured to calculate a total detection rate by adding detection data from all of the detectors in the detector array 2100. The processor 2107 may be further configured to compare that total detection rate to a predetermined background rate, to calculate the statistical uncertainty of the total detection rate, and to thereby determine whether a source is present according to a formula. For example, the formula may include a ratio in which the numerator is the total counting rate minus a previously-determined background rate, and the denominator is the statistical uncertainty in the total counting rate. The uncertainty may be equal to the square root of the number of detections in the detector array 2100, divided by the amount of time, in seconds, over which those detections are accumulated. Alternatively, and equivalently, the numerator may be the total number of detections minus the expected background (which is equal to the number of seconds times the predetermined background rate), and the denominator may be the square root of the number of detections. In either case, the display 2106 may indicate the ratio so calculated, or it may show an alarm if the ratio exceeds a predetermined threshold such as 1 or 2 or 3 (that is, the detection rate exceeds the expected background by 1 or 2 or 3 standard deviations), or other information indicating whether a source is present based on the total detection rate of the detector array 2100.

Figure 22:
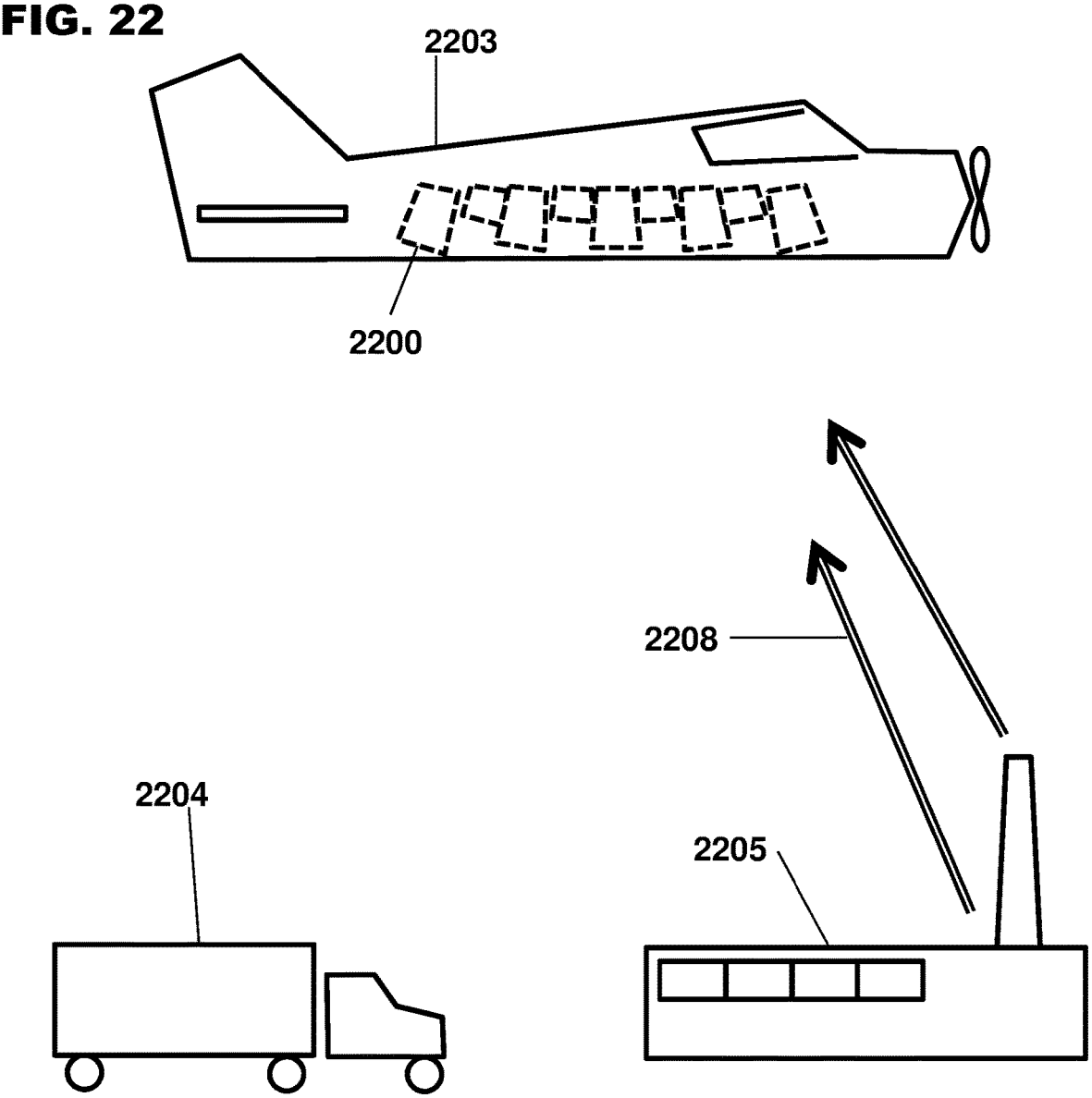
FIG. 22 is a sketch showing an exemplary detector array mounted in an aircraft, according to some embodiments.

FIG. 22 is a sketch of an exemplary imaging detector array 2200 mounted in or on an aircraft 2203 such as a drone, helicopter, hovercraft, or airplane for example. As the aircraft 2203 flies over an inspection region, the detector array 2200 acquires directional data on sources below the aircraft 2203, including vehicles 2204 and fixed sites such as factories 2205 and warehouses, and the like. The system can acquire a radiographic image that shows the distribution of radiation coming from sources in the inspection region. The system may also record detection data in real-time, along with geographical data such as the GPS coordinates and compass heading and altitude of the aircraft. A radiation map can then be prepared from that time-stamped data by calculating the ground location corresponding to each recorded particle 2208 in each detector of the detector array 2200. The radiation map may then be combined with a visible-light or infrared image acquired concurrently, so that the composite image indicates which items on the ground are radioactive. Alternatively, the radiation map can be superposed on a satellite image of the area scanned, or a road map for example, thereby localizing the radiation sources geographically.

Figure 23:
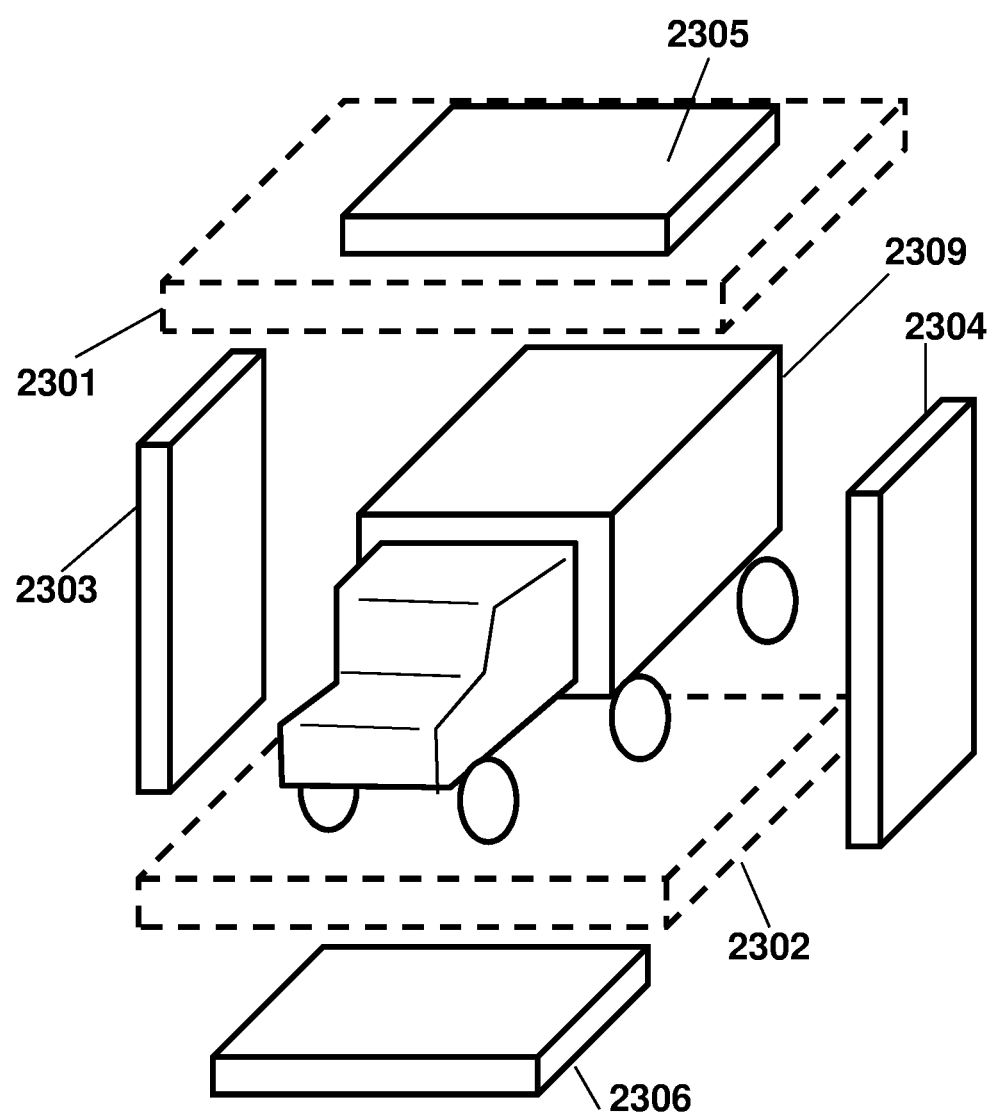
FIG. 23 is a perspective sketch showing a vehicle being scanned by multiple exemplary detector arrays, according to some embodiments.

FIG. 23 is a perspective sketch of an exemplary vehicle inspection station that uses both radiation detection and cosmic ray scattering to detect clandestine weapons. Cosmic rays are mainly GeV-energy muons which readily pass through large amounts of material. Here a truck 2309 is being scanned by an upper 2301 and lower 2302 cosmic ray tracking chamber (in dash). When cosmic rays pass through high-Z materials such as a nuclear weapon or dense shielding, the cosmic rays scatter in a characteristic way. The tracking chambers 2301-2302 compare the cosmic ray track directions above and below the inspection object 2309, thereby detecting the nuclear material or massive shield according to the scattering patterns. In addition, two imaging detector arrays 2303, 2304 are positioned on both sides of the inspection object 2309 to detect and localize radioactive sources that the cosmic ray tracking chambers 2301, 2302 may miss, such as a radiological weapon that may contain no high-Z material. By remaining outside the field of view of the tracking chambers, the imaging detector arrays 2303, 2304 thereby avoid causing additional scattering of the cosmic rays, or otherwise interfering with the cosmic ray measurement. In addition, two more detector arrays 2305, 2306 are shown above the upper tracking chamber 2301 and below the lower tracking chamber 2302, to image sources in the inspection object 2309 from orthogonal directions. Often an adversary will make the shielding thicker on the sides and thinner at the top and bottom, since many vehicle inspection stations have radiation detectors only on the sides. But with the additional detector arrays 2305, 2306, the contraband is readily detected.

Figure 24:
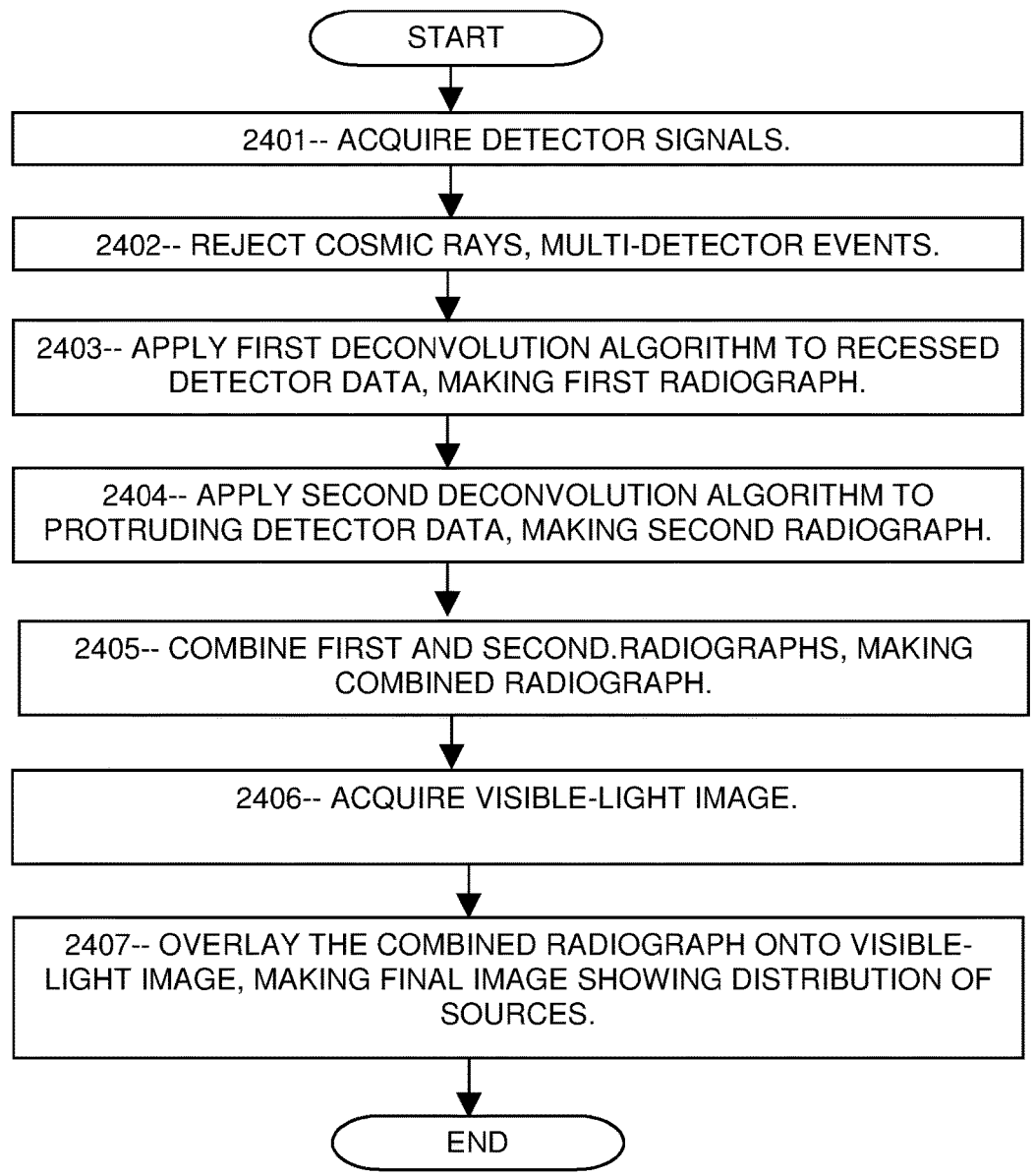
FIG. 24 is a flowchart of an exemplary method of producing a composite image showing the distribution of sources among items in view, according to some embodiments.

FIG. 24 is a flowchart of an exemplary method of producing a composite image showing the distribution of radiation sources in an inspection region. The method may be encoded in instructions on computer-readable non-transient media and executed by the processor or other processor to produce the composite image, thereby showing both the items in the inspection region and the radiation distribution detected in the inspection region.

At block 2401, the signals from the detector array may be accumulated for a predetermined time. Defective events such as cosmic rays and multi-detector events may be rejected 2402 in real-time or later. At block 2403, the processor may apply a deconvolution algorithm to the recessed detector data to sharpen the resolution, resulting in a first radiographic image. At block 2404, the processor may apply a different deconvolution algorithm to process the protruding detector data. At block 2405, the processed (or raw) radiographic images may be combined, producing an improved radiographic image with improved signal-to-noise ratio and/or sharper resolution. At block 2406, a visible-light photographic image (or infrared or other spatial image) may be acquired, and the radiographic image may be overlaid at block 2407 or otherwise combined with the visible-light image to produce a composite image that shows the distribution of radiation among items in view. Alternatively, one or both of the radiographic images may be combined with the photographic image without first combining the two radiographic images.

Embodiments of the imaging detector array described herein can provide many advantages over conventional detectors and can economically solve important security inspection problems. Embodiments can: (a) detect a source with high sensitivity, due to the large area and high intrinsic efficiency of detector arrays as described, (b) produce a two-dimensional radiographic image showing the distribution of radiation sources in the inspection region, (c) scan trucks, cargo containers, railcars, airplanes, vans, automobiles, boats, pedestrians, baggage, cargo, mail, conveyorized matter, fluid in pipes, and many other things to detect and localize radioactive materials, (d) detect a plurality of radioactive sources simultaneously and indicate their respective locations, (e) cooperate with a cosmic ray scattering inspection system, thereby providing two contrasting detection modes for detecting nuclear materials, (f) scan across a wide area and detect nuclear materials in regions such as an urban environment, (g) be assembled from available detector types including gamma-blind neutron detectors, neutron-blind gamma detectors, PSD or ionization-dependent scintillators that separately detect both neutrons and gammas, gaseous ionization type detectors, and low-cost liquid scintillators, according to some embodiments.

The ability to localize a clandestine radioactive source rapidly is a key enabling factor in nuclear and radiological threat detection. Advanced radiation detection, localization, and imaging systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is defined by the appended claims.

What is claimed is:

1. A system for detecting and imaging radiation sources, comprising:
   a detector array comprising at least 40 detectors, each detector configured to detect particles from the radiation sources and responsively emit a signal, wherein the at least 40 detectors comprise protruding detectors interleaved with recessed detectors, each recessed detector being adjacent to a plurality of protruding detectors, and each protruding detector protruding beyond the adjacent recessed detectors by an offset distance that is at least equal to the thickness of the recessed detectors;
   a camera configured to acquire a photographic image of an inspection region; and
   non-transient computer-readable media containing instructions for a method that includes preparing a first radiographic image according to detection data of the recessed detectors, preparing a second radiographic image according to detection data of the protruding detectors, acquiring the photographic image of the inspection region, and producing a composite image showing the spatial distribution of the radiation sources in the inspection region by combining the first and second radiographic images with the photographic image.

2. The system of claim 1, wherein each recessed detector is surrounded by protruding detectors which are configured to block particles arriving at angles above a predetermined angle and to admit particles arriving at angles below the predetermined angle, relative to the orientation direction of the adjacent protruding detectors.

3. The system of claim 1, wherein each detector has a prism shape with parallel sides.

4. The system of claim 1, wherein each detector is tapered, and adjacent detectors are positioned face to face.

5. The system of claim 1, wherein the thickness of the protruding detectors is at least equal to the average interaction distance of the particles therein.

6. The system of claim 1, wherein the recessed detectors are shorter than the protruding detectors by a distance at least equal to the thickness of the recessed detectors.

7. The system of claim 1, wherein the recessed detectors and the protruding detectors have substantially the same size and shape, and wherein the recessed detectors are displaced toward the back of the detector array by the offset distance.

8. The system of claim 1, wherein each protruding detector is oriented radially from a focal point that is located behind the detector array.

9. The system of claim 1, wherein the back of the detector array is a portion of a spherical surface.

10. The system of claim 1, wherein the protruding and recessed detectors are arranged in a checkerboard pattern.

11. The system of claim 1, wherein the detector array includes no passive collimators and no passive shields.

12. The system of claim 1, wherein the photographic image represents both visible and infrared light.

13. The system of claim 1, wherein the type of radiation detected from each source is indicated in the composite image by colors.

14. The system of claim 1, further including a processor configured to determine, when an edgemost detector has a higher detection rate than the adjacent detectors, that a radiation source is located outside the field of view of the detector array.

15. The system of claim 1, further including a processor configured to apply a first deconvolution algorithm to the detection data of the recessed detectors, and a second deconvolution algorithm to the detection data of the protruding detectors.

16. The system of claim 15 wherein the first deconvolution algorithm is based on an angular sensitivity distribution of the recessed detectors, and the second deconvolution algorithm is based on an angular sensitivity distribution of the protruding detectors.

17. The system of claim 1, further comprising a portable enclosure, at least one carrying handle, and a flat-screen display configured to show the composite image.

18. The system of claim 1, wherein the system is mounted in or on an aircraft and is configured to image sources below the aircraft.

19. The system of claim 1, further comprising a passageway through which pedestrians can pass, wherein the system is configured to image the sources periodically and to determine a velocity and a direction of travel for each source.

20. The system of claim 1, further comprising an upper tracking chamber and a lower tracking chamber configured to measure cosmic ray scattering within the inspection region.

* * * * *